United States Patent
Ehemann

(10) Patent No.: US 6,273,510 B1
(45) Date of Patent: Aug. 14, 2001

(54) PASSENGER SEAT SUPPORT ARRANGEMENT

(75) Inventor: Ernst K. Ehemann, Karlsruhe (DE)

(73) Assignee: Vogel Industrie GmbH, Karlsruhe (DE)

(*) Notice: Subject to any disclaimer, the term of this patent is extended or adjusted under 35 U.S.C. 154(b) by 0 days.

(21) Appl. No.: 09/511,951

(22) Filed: Feb. 23, 2000

(30) Foreign Application Priority Data

Mar. 18, 1999 (DE) .............................................. 199 12 111

(51) Int. Cl.[7] ...................................................... A47C 1/12
(52) U.S. Cl. ................ 297/440.22; 297/452.18; 248/346.03
(58) Field of Search .............................. 297/232, 440.22, 297/452.18; 248/346.03, 346.04

(56) References Cited

U.S. PATENT DOCUMENTS

| | | | |
|---|---|---|---|
| 3,669,497 | * | 6/1972 | Massonnet ................... 297/440.22 X |
| 3,702,204 | * | 11/1972 | Tipton et al. ................ 297/440.22 X |
| 3,877,671 | * | 4/1975 | Underwood et al. ............ 248/346.03 |
| 4,761,036 | * | 8/1988 | Vogel ........................ 297/440.22 X |
| 5,655,816 | * | 8/1997 | Magnusson et al. ........ 297/440.22 X |

* cited by examiner

Primary Examiner—Peter R. Brown
(74) Attorney, Agent, or Firm—Klaus T. Bach

(57) ABSTRACT

In a passenger seat support arrangement for a people mover comprising a seat portion and a seat portion support structure including a transverse beam on which the seat portion is supported, the transverse beam has, in its top side adjacent the seat portion, at least one recess which extends into the transverse beam and has a sidewardly extending undercut with an inclined top wall having at the base of the undercut a greater distance from the top side of the transverse beam than at its entrance, and the seat portion has at least one projection extending into the recess and having a bent-over end shaped so as to be snugly received in the undercut for firmly holding the seat portion in engagement with the transverse beam.

7 Claims, 2 Drawing Sheets

PASSENGER SEAT SUPPORT ARRANGEMENT

BACKGROUND OF THE INVENTION

The invention resides in a passenger seat support arrangement for a people mover with a seat and a seat support structure, which includes at least one transverse beam on which the seat is supported.

Such a passenger seat is disclosed, for example, in EP 0 283 571 A1. In this known passenger seat, the transverse beam is in the form of a box spar which has openings and which forms a profiled mounting track with a C-shaped cross-section connected to the box spar at the top and the bottom. Threaded blocks are inserted into the mounting tracks by which the transverse beam can be attached to support legs and the seat can be bolted onto the transverse beam. Although such a mounting of the passenger seat has important advantages during mounting it is relatively expensive particularly for mounting simple low-priced seats.

It is the object of the invention to provide a passenger seat in such a way that it can be mounted in a simple and relatively inexpensive manner.

SUMMARY OF THE INVENTION

In a passenger seat support arrangement for a people mover comprising a seat portion and a seat portion support structure including a transverse beam on which the seat portion is supported, the transverse beam has in its top side adjacent the seat portion at least one recess which extends into the transverse beam and has a sidewardly extending undercut with an inclined top wall having at the base of the undercut a greater distance from the top side of the transverse beam than at its entrance, and the seat portion has at least one projection extending into the recess and having a bent-over end shaped so as to be snugly received in the undercut for firmly holding the seat portion in engagement with the transverse beam.

Since the wall adjacent the upper side of the transverse beam has, in the basis of the undercut section, a larger distance from the upper side of the transverse beam than at the entrance of the undercut, the projections are pulled into the transverse beam when they are pushed into the undercut section. As a result, the seat portion is pulled into firm engagement with the transverse beam. The wall of the undercut adjacent the upper side of the transverse beam may be for example, a planar section extending at an angle to the upper side of the transverse beam which is also planar. The undercut section may then be for example V-shaped in cross-section.

However, the wall of the undercut adjacent the outside of the transverse beam may also be curved. It is particularly advantageous if the undercut has an end section, which is curved with a certain radius and the end of the bent-over end portion of the projection remote from the seat portion has a shape corresponding to the shape of the undercut as it will be shown in a preferred embodiment to be described. If the undercut has an end wall curved with a particular radius and the projection is, at its end remote from the seat portion, correspondingly curved, the projection is tightly received in the undercut. With the radius, the projection is centered in the undercut. Furthermore, the projection is engaged with the walls of the undercut over a relatively large surface area.

It is in this connection particularly advantageous if the projection engages portions of the wall of the undercut, which extend at an angle of 90° relative to each other. As a result, the seat portion is fixed in a horizontal and a vertical direction when mounted onto the transverse beam.

In another embodiment of the invention, a retaining element is provided by which the projection is fixed in the recess. The retaining element is preferably screwed onto the transverse beam. Preferably, the retaining element is so arranged that it engages the projection at its side opposite the inner end of the undercut. In this way, the projection is pressed into the undercut whereby it is centered and fixed in position as described earlier. The seat portion can therefore be firmly mounted onto the transverse beam simply by screwing the retaining element to the transverse beam.

In a further embodiment of the invention, the projection is formed integrally with the seat portion. This is particularly advantageous with regard to the rigidity of the connection between the projection and the seat portion. Furthermore, handling of the seat portion is facilitated which is particularly advantageous for the mounting of the seat on the transverse beam.

In still another embodiment, the transverse beam is provided with two spaced identical recesses and the seat portion has two projections corresponding to the identical recesses. Such an arrangement is particularly easy to mount. The seat portion only needs to be placed onto the transverse beam such that the projections enter the recesses with the undercuts. Firm engagement is then obtained by mounting the retaining element, which engages the projection at the side opposite the basis of the undercut. In this way, the two projections are pressed into the respective undercuts whereby the seat portion is firmly mounted on the transverse beam. Although it is sufficient to provide a single retaining element, which engages in seat direction—the front projection, two retaining elements may be provided which engage both projections.

In a particularly advantageous embodiment, the transverse beam has the form of a box spar in which the recesses with the undercuts are in the form of a track-like profile structure and which includes at its side remote from the seat portion, that is at its bottom side, at least one groove with a T-shaped cross-section. The projections may also extend over the full width of the seat portion. But they may also extend over only a part of the width of the seat portion and several projections may be arranged in side-by-side relationship. The transverse beam then does not need to have continuous recesses but recesses may be provided only at the locations corresponding to the projections to be received in the recesses with undercuts. Then the seating portion would be firmly fixed in a sideward direction.

Further features and advantages of the invention will become apparent from the following description of a preferred embodiment shown in the accompanying drawings:

DESCRIPTION OF A PREFERRED EMBODIMENT

Figure 1:
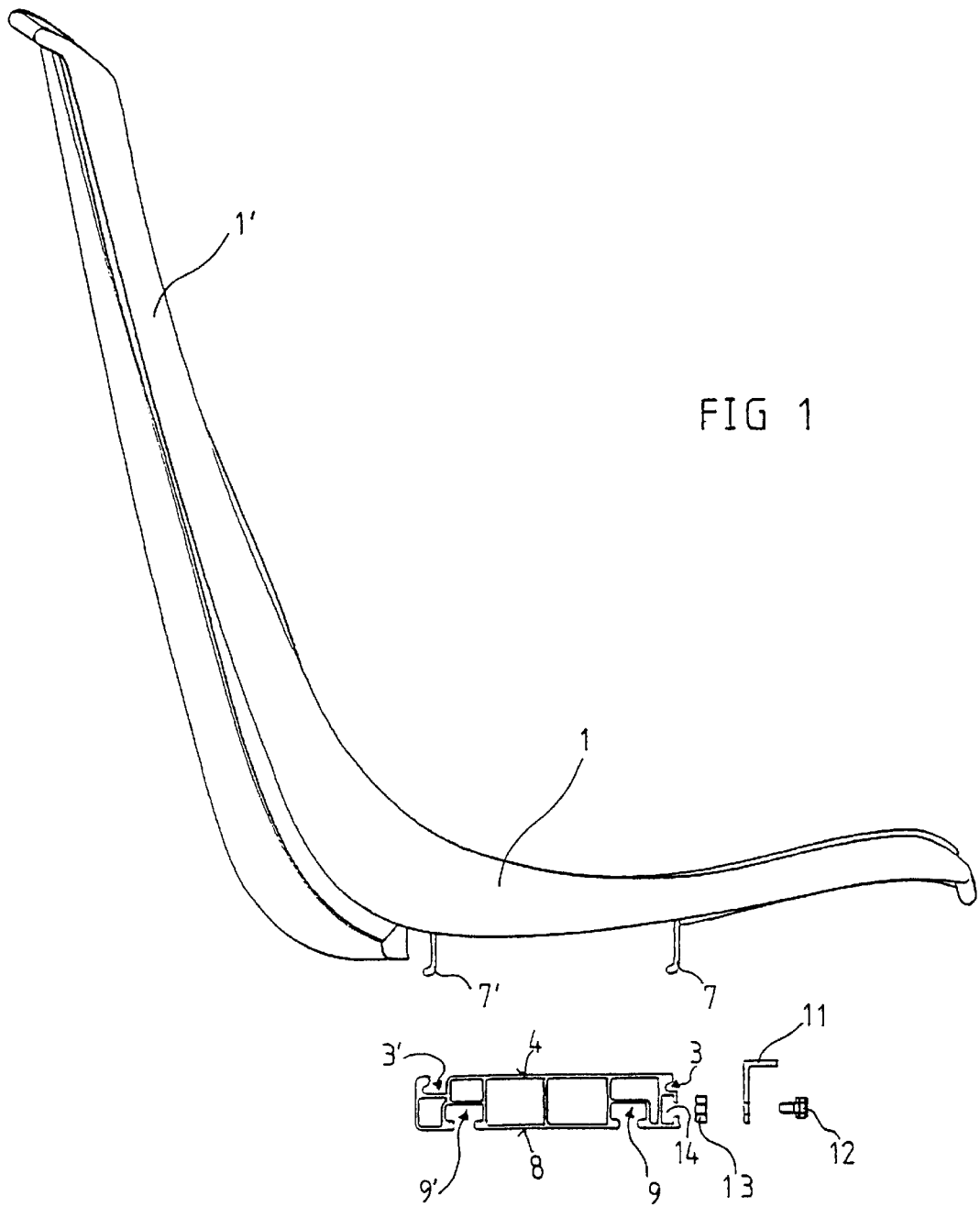
FIG. 1 is an exploded view of a seat and a seat support arrangement including a transverse beam and a retaining member.

As shown in FIG. 1, a seat shell comprises a seat portion 1 and a backrest portion 1'. Below the seat portion 1, there are projections 7,7', which are identical and which are formed integrally with the seat portion 1. The projections 7, 7' have, at their ends remote from the seat portion 1, end sections, which are bent over toward the rear that is the backrest end of the seat portion 1. The bent-over end of the projections is curved.

Figure 2:
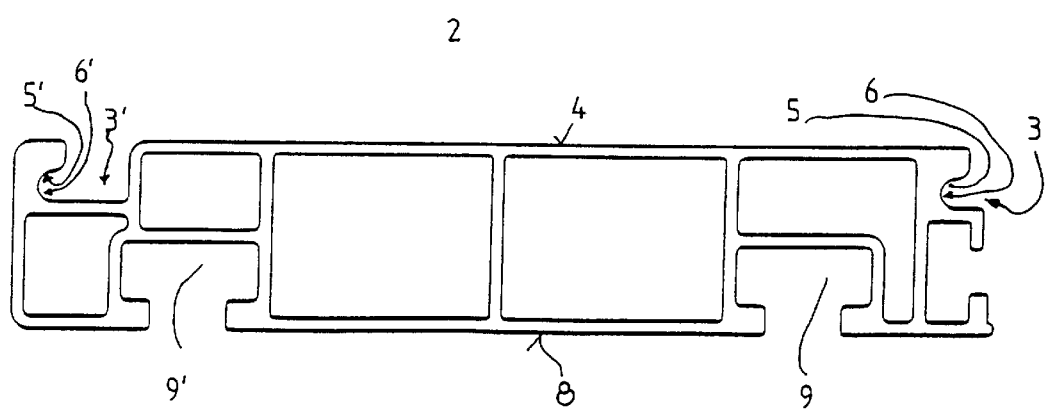
FIG. 2 is a cross-sectional view of the transverse beam according to the invention.

A transverse beam 2, which is in the form of a box spar, includes at a first (top) side thereof adjacent the seat portion 1 a front recess 3 and a rear recess 3 each of which includes a lateral undercut section. As shown particularly in FIG. 2, the recesses 3, 3' are rounded in the bases 6, 6' of their undercuts. As a result, the wall 5, 5' disposed adjacent the first (top) outer side 4 of the transverse beam 2 has, in the base 6, 6' of the undercut, a greater distance from the outer side 4 of the transverse beam 2 than it has at the entrance of the undercut.

The radii of the curved ends of the undercuts correspond to the radii of the projections 7, 7'. As a result, the projections 7, 7" are centered in the undercuts in a simple manner.

For mounting the seat portion 1 on the transverse beam 2, the seat portion 1 is so placed onto the transverse beam 2 that the projections 7, 7' extend into the recesses 3, 3'. A retaining element 11 is then bolted onto the front of the transverse beam 2 such that it engages the projection 7 and applies a pressure toward the rear of the seat. As a result, the bentover end sections of the projections 7, 7' are moved into the respective undercut sections of the recesses 3, 3', whereby the curved ends of the projections 7, 7' are received in the rounded bases 6, 6', of the recesses. The curved end sections 7, 7', which are received in the rounded bases 6, 6' pull the seat portion into firm engagement with the transverse beam 2.

In order to permit the mounting of the transverse beam 2, for example, on support legs, which are not shown (see U.S. Pat. No. 5,098,156), the transverse beam 2 includes at its second side 8 remote from the seat portion 1, T- shaped grooves 9, 9' into which also threaded blocks may be inserted by way of which the transverse beam 2 can be bolted onto the support legs.

What is claimed is:

1. A passenger seat for a people mover, comprising a seat portion and a seat portion support structure, said support structure including a transverse beam on which said seat portion is supported, said transverse beam having, at a first side thereof adjacent said seat portion, at least one recess extending from said first side into said transverse beam and including an undercut with an entrance and a base and having an internal wall portion adjacent said first side of said transverse beam which wall portion is inclined with respect to said first side of said transverse beam such that it is closer to said first side at the entrance to said undercut than it is at the base of the undercut, and said seat portion having at its side adjacent said transverse beam at least one projection extending into said recess and into said undercut and being engaged therein for holding said seat portion on said transverse beam.

2. A passenger seat according to claim 1, wherein the undercut of said recess is curved at its base with a certain radius and said projection has a bent-over end portion adapted in shape to the shape of the base of said undercut for snugly receiving said bent-over end portion of said projection in said undercut.

3. A passenger seat according to claim 2, wherein said transverse beam includes two spaced recesses with undercuts and said seat portion includes two projections arranged and shaped so as to be received in said two recesses with the bent-over portions being received in the respective undercuts for firmly holding said seat portion in engagement with said transverse beam.

4. A passenger seat according to claim 3, wherein said transverse beam is a box spar having top and bottom walls, and said recesses are formed in its top wall adjacent said seat portion, and having in its bottom wall at least one longitudinally extending T-shaped groove for mounting said transverse beams on support means.

5. A passenger seat according to claim 1, wherein a retaining element is provided for fixing said projection in said recess.

6. A passenger seat according to claim 5, wherein said retaining element is screwed onto said transverse beam.

7. A passenger seat according to claim 1, wherein said projection is formed as an integral part of said seat portion.

* * * * *